J. Bound's Pliers.
73289
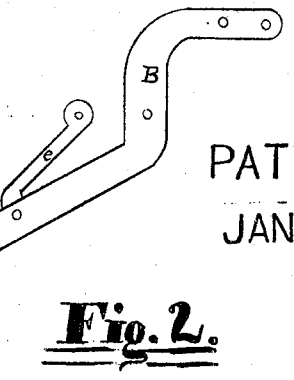
PATENTED
JAN 14 1868
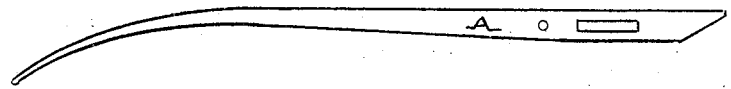
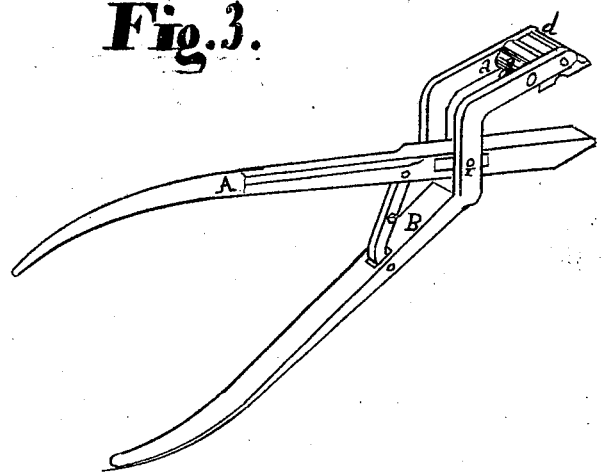
Witnesses: Jno. N. Ellis, Jas. V. White
Inventor: Jas. Bound per J. N. Alexander

United States Patent Office.

JAMES BOUNDS, OF BRIDGEPORT, CONNECTICUT.

Letters Patent No. 73,289, dated January 14, 1868.

IMPROVEMENT IN PLIERS.

The Schedule referred to in these Letters Patent and making part of the same.

TO ALL WHOM IT MAY CONCERN:

Be it known that I, JAMES BOUNDS, of Bridgeport, in the county of Fairfield, and State of Connecticut, have invented certain new and useful Improvements in Pliers; and I do hereby declare that the following is a full, clear, and exact description thereof, reference being had to the accompanying drawings, and to the letters of reference marked thereon, which form a part of this specification, in which—

Figures 1 and 2 are side views of the two levers or shanks which form the pliers.

Figure 3 is a perspective of the pliers in a finished condition.

Figure 4 is a side view of the movable jaw; and

Figure 5, a side view of the dog or pawl for retaining the jaw in position.

The object of this invention is to furnish carpenters and others who use a tool of this description with pliers, which, from their peculiar construction, are better adapted to some purposes than those in ordinary use, while in all they are equally effective and desirable.

The nature of the invention consists in providing the end of one of the shanks or levers with a movable jaw, which, by means of a dog or pawl, can be retained in that position most appropriate to the purpose for which it is employed.

The invention consists further in the combination of the foregoing with a sliding shank, substantially as herein set forth.

To enable others skilled in the art to make and use it, I will now describe its construction and operation:

A represents one of the levers provided with an elongated slot, as shown in fig. 2. B is the other lever or shank, shaped as shown in fig. 1. That portion of this shank which forms the head, marked $a$, is slotted sufficiently wide to allow the shank A to slide between the cheeks thus made. $i$ represents a pin, which confines the two shanks A B together, as fully shown in fig. 3. $e$ is a connecting-link or pin, each end of which rests in small excavations in the shanks, and there pivoted. It will be observed that this link or pin is placed obliquely, as shown in fig. 1. $d$ represents the movable jaw, the back part of which is serrated, in order that when properly adjusted, the dog $g$ may retain or hold it in position. $b$ represents a pin, by means of which the dog $g$ is both secured and operated. It will thus be seen that the movable or adjustable jaw $d$ may be used either in a parallel position with the other jaw, or it may be placed in an oblique position, and there securely retained by the dog $g$.

Having thus fully described my invention, what I claim, and desire to secure by Letters Patent, is—

The adjustable jaw $d$, dog $g$, shanks A B, and link $e$, the whole being constructed and combined substantially as herein set forth and described.

In testimony that I claim the foregoing as my own, I affix my signature in presence of two witnesses.

JAMES BOUNDS.

Witnesses:
DAVIS S. COLE,
M. DIAMOND.